(12) United States Patent
Chen et al.

(10) Patent No.: US 11,052,881 B1
(45) Date of Patent: Jul. 6, 2021

(54) HYDRAULIC RETARDING CONTROL SYSTEM

(71) Applicant: Caterpillar Underground Mining Pty. Ltd., South Burnie (AU)

(72) Inventors: Dayao Chen, Bolingbrook, IL (US); William F. Erdman, Saint Charles, IL (US); Edward W. Mate, Manhattan, IL (US)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 0 days.

(21) Appl. No.: 16/937,160

(22) Filed: Jul. 23, 2020

(51) Int. Cl.
| | |
|---|---|
| *B60T 1/093* | (2006.01) |
| *F02B 63/06* | (2006.01) |
| *F15B 13/04* | (2006.01) |
| *F15B 13/02* | (2006.01) |
| *E02F 9/22* | (2006.01) |
| *B60K 31/08* | (2006.01) |
| *B60T 10/04* | (2006.01) |

(52) U.S. Cl.
CPC .............. *B60T 1/093* (2013.01); *B60K 31/08* (2013.01); *B60T 10/04* (2013.01); *E02F 9/2235* (2013.01); *E02F 9/2267* (2013.01); *E02F 9/2296* (2013.01); *F02B 63/06* (2013.01); *F15B 13/024* (2013.01); *F15B 13/0401* (2013.01); *E02F 9/2228* (2013.01)

(58) Field of Classification Search
CPC ........ B60T 1/093; B60T 10/04; B60T 13/585; B60T 2201/04; F16D 57/06; F15B 13/024; F15B 13/0258; F15B 13/025
See application file for complete search history.

(56) References Cited

U.S. PATENT DOCUMENTS

| | | | |
|---|---|---|---|
| 4,307,916 A * | 12/1981 | Straut .................... | B60T 13/12 303/15 |
| 6,170,587 B1 | 1/2001 | Bullock | |
| 6,202,783 B1 * | 3/2001 | Taylor .................... | B60T 1/093 180/305 |
| 6,755,489 B2 | 6/2004 | Kuno et al. | |
| 6,986,727 B2 | 1/2006 | Kuras et al. | |

(Continued)

FOREIGN PATENT DOCUMENTS

| | | |
|---|---|---|
| CN | 102029888 B | 7/2013 |
| CN | 108128212 A | 6/2018 |

(Continued)

*Primary Examiner* — Thomas E Lazo

(57) ABSTRACT

A work machine includes an electric drive system. The work machine includes a prime mover, a machine controller, and a hydraulic control system. The hydraulic control system includes a pump, a control valve and a retarding control valve. The pump is configured to supply pressurized fluid to the hydraulic control system via a supply line. The control valve is fluidly coupled to the pump via the supply line, and includes a pressure relief valve. The retarding control valve is fluidly connected to the pump and the control valve. The retarding control valve includes a solenoid valve, an orifice and a check valve. The solenoid valve is coupled to the machine controller, the orifice restricts a flow of the pressurized fluid through the supply line, and the check valve is coupled to a discharge line, which branches from a point along the supply line between the solenoid valve and the orifice.

20 Claims, 3 Drawing Sheets

(56) References Cited

U.S. PATENT DOCUMENTS

| | | | |
|---|---|---|---|
| 7,439,695 B2 | 10/2008 | Ngo et al. | |
| 7,460,941 B2 | 12/2008 | Sychra et al. | |
| 7,797,092 B2* | 9/2010 | Schifferer | F04B 49/002 |
| | | | 701/50 |
| 7,798,277 B2* | 9/2010 | Juricak | B60T 10/04 |
| | | | 180/307 |
| 9,067,575 B2* | 6/2015 | Wargh | B60T 10/04 |
| 9,464,407 B2* | 10/2016 | Stutchbury | B60K 17/3467 |
| 2017/0120884 A1* | 5/2017 | Mate | F16D 66/02 |

FOREIGN PATENT DOCUMENTS

| | | |
|---|---|---|
| CN | 209320668 U | 8/2019 |
| DE | 4225080 A1 | 2/1993 |

\* cited by examiner

HYDRAULIC RETARDING CONTROL SYSTEM

TECHNICAL FIELD

The present disclosure generally relates to a hydraulic system of a machine, and more particularly to a system including a control strategy for retarding speed of a work machine.

BACKGROUND

Work machines, such as load or haul trucks employed in underground mining applications, may repeatedly travel along sloped terrain during a work cycle. During travel along terrain sloping downward, controlling the speed of the work machine may prove difficult for traditional friction-based braking systems alone, especially when the work machine is carrying a load of material, and may lead to increased brake wear, increased braking noise, wasted energy in the form of heat due to friction, and brake failure. As such, a retarding system may be utilized to supplement the friction-based braking system when additional deceleration is needed to control the speed of the work machine.

In work machines driven by combustion engines or similar prime movers, for example, retarding systems may include an engine or exhaust brake configured to increase the natural resistance of the engine torque when braking is needed. Typically, work machines include a variety of components that are directly or indirectly powered by the engine, such as fans, motors, pumps, and/or other like components. These components may also be activated in conjunction with the engine retarder to provide additional engine torque resistance.

Fully electric work machines, on the other hand, rely on electric motors or generators power by one or more batteries. Generally, the retarding systems of these work machines receive less retarding power from the prime movers, and instead rely on power obtained from other machine systems, such as the electrical or hydraulic systems.

Prior attempts at controlling brake forces in electric vehicles have been directed to systems for optimizing mileage per charge of the battery installed in the vehicle. For example, U.S. Pat. No. 6,755,489 discloses a system that reduces electric power consumed to generate a drive torque of the electric motor even while the vehicle is stopping. When the system senses a throttle is in an open position, but the vehicle is in a stopping state, it applies a predetermined hydraulic pressure to a wheel cylinder of the wheel and decreases a drive torque outputted to the electric motor of the vehicle, thereby reducing the electric power consumed at the battery, and increasing mileage per charge.

A need consequently exists for a hydraulic retarding system able to control the speed of an electric work machine, especially while traveling downhill, and which reduces the retarding power consumed from other machine systems.

SUMMARY

In accordance with one aspect of the present disclosure, a work machine with an electric drive system may be disclosed. The work machine may include a prime mover, a machine controller and a hydraulic control system. The hydraulic control system may include a pump, a control valve and a retarding control valve. The pump may be configured to supply pressurized fluid to the hydraulic control system via a supply line. The control valve may be fluidly coupled to the pump via the supply line, and may include a pressure relief valve. Finally, the retarding control valve may be fluidly connected to the pump and the control valve via the supply line. The retarding control valve may include a solenoid valve coupled to the machine controller, an orifice restricting a flow of the pressurized fluid through the supply line, and a check valve coupled to a discharge line. The discharge line may be configured to branch from a point along the supply line between the solenoid valve and the orifice.

In accordance with another aspect of the present disclosure, a hydraulic control system of a work machine may be disclosed. The hydraulic control system may include a pump, a control valve and a retarding control valve. The pump may be configured to supply pressurized fluid to the hydraulic control system via a supply line. The control valve may be fluidly coupled to the pump via the supply line, and may include a pressure relief valve. The retarding control valve may be fluidly connected to the pump and the control valve via the supply line, and may include a solenoid valve coupled to a machine controller, an orifice restricting a flow of the pressurized fluid through the supply line, and a check valve coupled to a discharge line. The discharge line may be configured to branch from a point along the supply line between the solenoid valve and the orifice.

In accordance with yet another aspect of the present disclosure, a retarding control valve of a work machine may be disclosed. The retarding control valve may include a proportional solenoid valve coupled to a machine controller. The machine controller may be configured to determine a retarding requirement, and to actuate the solenoid valve based on the determined retarding requirement. The solenoid valve may be fluidly coupled to a hydraulic pump via a supply line. The retarding control valve may also include an orifice positioned downstream from the proportional solenoid valve and fluidly connected to the solenoid valve. The orifice may restrict a flow of a pressurized fluid through the supply line when the solenoid valve is actuated. The retarding control valve may also include a spring-loaded check valve coupled to a discharge line. The discharge line may be configured to branch from a point along the supply line between the solenoid valve and the orifice, and the check valve may be configured to selectively allow a uni-directional flow of the pressurized fluid from the branch point along the supply line to a load sense line.

These and other aspects and features of the present disclosure will be better understood upon reading the following detailed description, when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
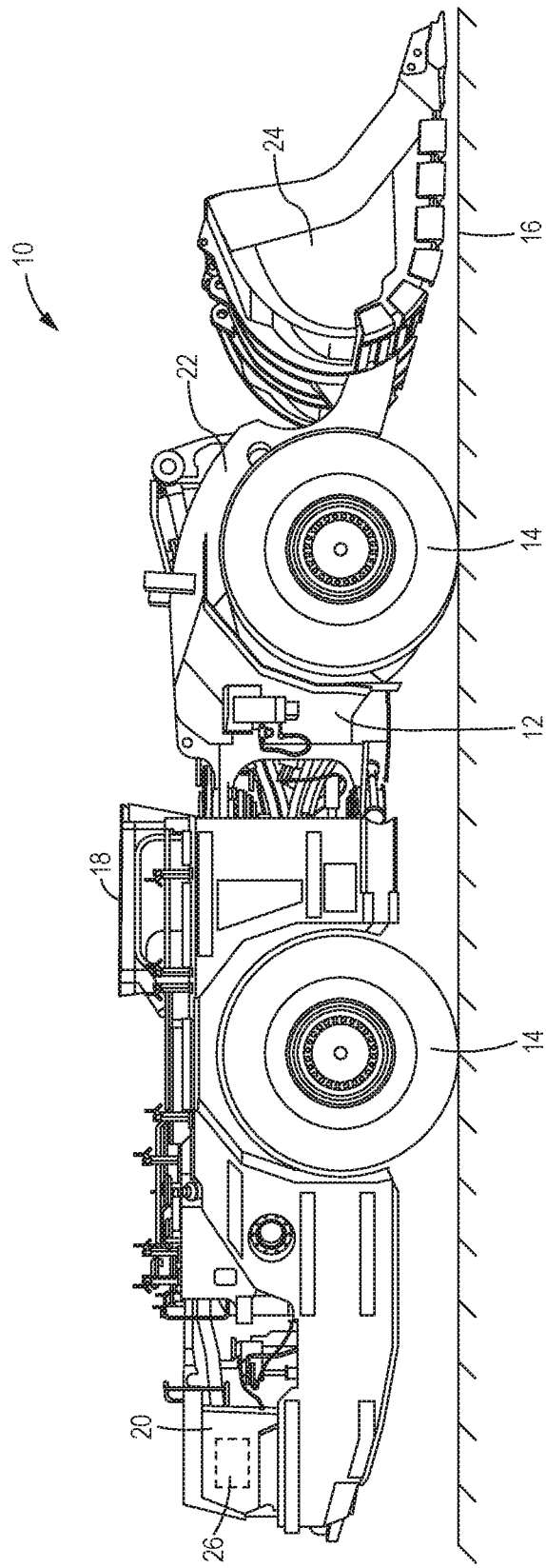
FIG. 1 is a side view of a work machine, according to an embodiment of the present disclosure.

FIG. 1 illustrates a side view of a work machine 10, according to an embodiment of the present disclosure. The exemplary work machine 10 may be a vehicle such as a Load Haul Dump (LHD) loader adapted for underground mining applications, although the features disclosed herein may be utilized with other types of machines, regardless of the type of work performed by the machine. The term "machine" includes vehicles or machines. The illustrated work machine 10 generally includes a frame 12 that supports one or more ground engaging mechanisms 14 configured to engage a ground surface 16 of a worksite, an operator cab 18, and a prime mover 26 that may be housed within an enclosure 20. The work machine 10 may further include one or more lift arms 22 that are movably or pivotably coupled to the frame 12 at one end of the work machine. A work tool 24, (e.g., a bucket), or other auxiliary structure, may be pivotally attached to the lift arms 22. While the work tool 24 illustrated in FIG. 1 may lift and tilt relative to the work machine 10, it may alternatively or additionally pivot, rotate, slide, swing, or move in any other manner known in the art.

The prime mover 26 may embody a non-combustion source of power such as a fuel cell, a power storage device, a solar cell, or another suitable source of power, as well as its systems and components thereof, as described herein. In addition, the prime mover 26 may produce mechanical and/or electrical power output, which may be converted to hydraulic power in the form of pressurized fluid. The pressurized fluid may be subsequently converted into a mechanical motion to operate various components of the work machine.

Figure 2:
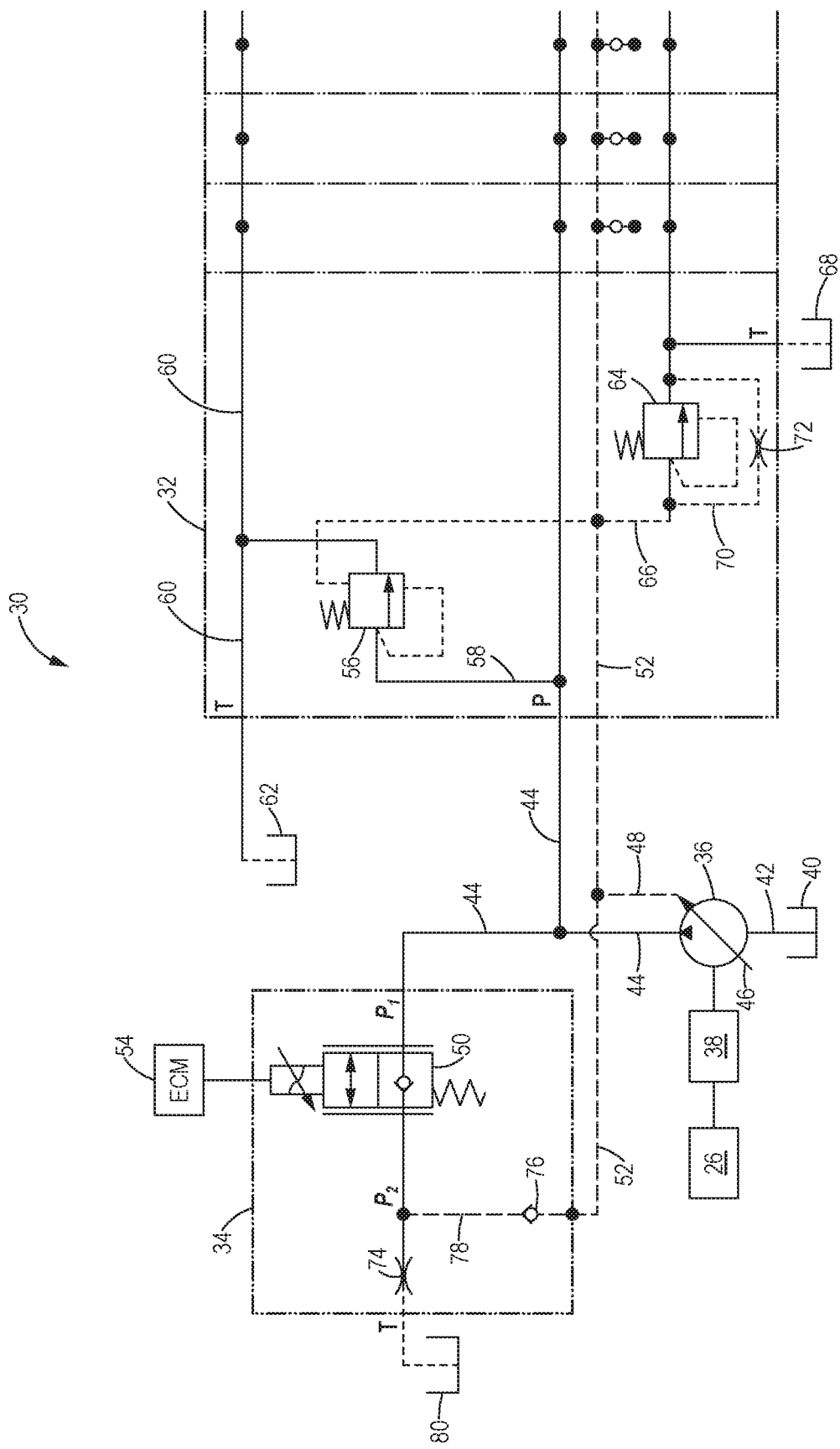
FIG. 2 is a schematic of a hydraulic system that may be employed by the work machine of FIG. 1, according to an embodiment of the present disclosure.
Figure 3:
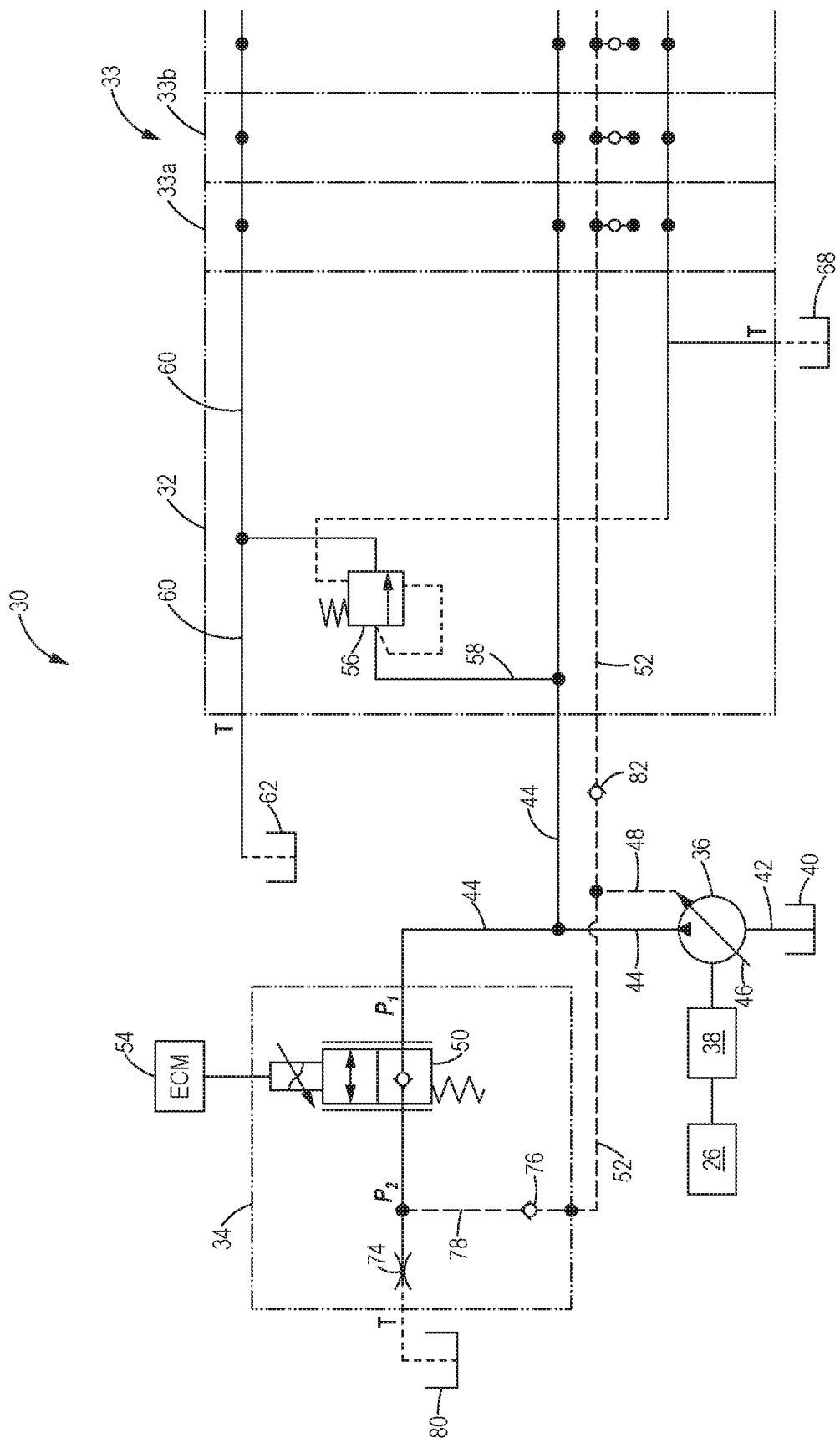
FIG. 3 is a schematic of a hydraulic system that may be employed by the work machine of FIG. 1, according to an embodiment of the present disclosure.

Referring now to FIGS. 2 and 3, a hydraulic control system 30 is illustrated including an implement control valve 32 and a retarding control valve 34, in accordance with an embodiment of the present disclosure. The implement control valve 32, as illustrated and described herein, may control operations of various implement valves 33 (e.g., 33a, 33b) that may be in fluid communication with one or more hydraulic cylinders (not shown) associated with implements of the work machine 10 such as the lift arms 22 and work tool 24 (as shown in FIG. 1). However, it should be noted and understood that this control valve may alternatively or additionally control other functions associated with the work machine, including, but not limited to, cooling systems, steering systems, etc. The hydraulic control system 30 may also include a pump 36 that is indirectly connected to the prime mover 26 via a torque converter 38. The prime mover 26 may drive the pump 36 to draw in low-pressure fluid from a tank 40 via a suction line 42 and to discharge the fluid at an elevated pressure into a supply line 44.

The tank 40 may constitute a reservoir configured to hold a supply of fluid. The fluid may include, for example, a dedicated hydraulic oil, a transmission lubrication oil, or any other fluid known in the art. One or more hydraulic circuits within the work machine 10 may draw fluid from and return fluid to tank 40. It is also contemplated that the hydraulic control system 30 may be connected to multiple separate fluid tanks, if desired.

The pump 36 may have a variable displacement and be load-sense controlled to draw fluid from the tank 40 and discharge the fluid at an elevated pressure to at least the implement control valve 32 and retarding control valve 34. In other words, the pump 36 may include a stroke-adjusting mechanism 46, for example, a swashplate or spill valve, the position of which is hydro-mechanically adjusted based on a margin pressure (pressure differential), as will be described in further detail below. The pump 36 may accordingly be adjusted anywhere between a zero displacement position, at which substantially no fluid is discharged from the pump, to a maximum displacement position, at which fluid is discharged from the pump at a maximum rate. In the illustrated embodiment, a return branch 48 of a load sense line 52 may direct a load pressure signal to a hydro-mechanical controller (not shown) of the pump 36 that is indicative of fluid pressures (e.g., $P_2$) downstream. Based on a value of that signal (i.e. based on a pressure of the signal fluid within the return branch 48 of the load sense line 52), the pump controller may adjust the position of the stroke-adjusting mechanism 46 to increase (stroke up) or decrease (stroke down) the output of the pump 36 to maintain the margin pressure. It should be appreciated that, in other embodiments, the pump 36 may rely on an electronic controller or any other controller that is known in the art.

Fluid from the tank 40 may be discharged from the pump 36 into the supply line 44, a branch of which extends from the pump 36 to the retarding valve 50 of the retarding control valve 34. The retarding valve 50 may be a proportional solenoid valve, that may be in operative communication with a machine electronic control module (ECM) 54. The machine ECM 54 may include any type of device or any type of component that may interpret and/or execute information and/or instructions stored within a memory (not shown) to perform one or more functions. The machine ECM 54 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software. The machine ECM 54, for example, may receive information and/or execute instructions to determine that retarding is needed, what amount of retarding is needed, and in response to those determinations, supply the current to the retarding valve 50 at a level consistent with those determinations.

As mentioned briefly above, the displacement position of the pump 36 may depend, at least in part, on maintaining the margin pressure ($P_{margin}$) of the present hydraulic control system 30. To help ensure the margin pressure does not exceed a predetermined pressure threshold, the implement control valve 32 may include a margin relief valve 56. The margin relief valve 56 may be coupled to a first implement branch line 58 that extends between the supply line 44 and a secondary implement line 60 to a tank 62. The margin relief valve 56 thereby allows fluid to pass from an area of higher pressure to an area of lower pressure. In operation, when the pump discharge pressure in the supply line 44 reaches a predetermined pressure threshold above a load pressure in line 52, the margin relief valve 56 shifts to its relief position to dump fluid to the tank 62.

The margin pressure must also be maintained in the retarding control valve 34. More specifically, the pressure values across the retarding valve 50, for example $P_1$ and $P_2$, may vary depending on a position of the retarding valve. These pressure values may be sensed at the pump 36. Consequently, to maintain the margin pressure, the pump controller (not shown) may adjust the stroke and flow of the pump 36 to ensure the pressure difference across the retarding valve 50 valve, is ($\Delta P_{valve}$) equal to the margin pressure:

$$\Delta P_{valve} = P_1 - P_2 = P_{margin}$$

With specific reference to FIG. 2, the implement control valve 32 may also include a load sense relief valve 64. The load sense relief valve 64 is a pressure relief valve that may limit a load demand pressure to a predetermined maximum value. The load sense relief valve 64 may be coupled to a branch line 66 of the load sense line 52. In addition, the load sense relief valve 64 may also be coupled to the margin relief valve 56. In operation, when the load demand pressure exceeds a predetermined maximum value, the load sense relief valve 64 may shift to its relief position, allowing fluid to dump to a tank 68. In the disclosed embodiment, fluid flowing toward the load sense relief valve 64 may also travel via a bypass line 70 through an orifice 72, toward the tank 68.

With continued reference to FIGS. 2 and 3, the retarding control valve 34 may be used to generate hydraulic retarding power to slow the momentum of the work machine 10. The retarding control valve 34 may include the retarding valve 50, an orifice 74, and a check valve 76. As mentioned above, the retarding valve 50 may be a proportional solenoid-operated valve fluidly coupled to the supply line 44 and in operative communication with the machine ECM 54. In an aspect of the present disclosure, the retarding valve 50 may be a two-position valve that is operably moveable between a bi-directional flow-permitting position and a one-way or unidirectional flow-permitting position.

During a first mode of operation, when the retarding valve 50 is operatively positioned into the one-way flow-permitting position (shown in FIG. 2), fluid from the pump 36 is pumped into the supply line 44, but is stopped by, and is unable to flow through, the retarding valve. Conversely, in this position, the retarding valve 50 is configured to permit flow in the opposite direction, such as when fluid may flow into the supply line 44. In a similar manner, the check valve 76 is provided in a discharge line 78 coupled to the load sense line 52, to permit fluid flow into the load sense line. As will be discussed in further detail below, the first mode of operation may correspond to operation of the work machine 10 on a non-sloped surface and/or while the implements (e.g. the lift arm 22 and work tool 24) are in use. When these implements are in use, fluid may flow through the load sense line 52 toward the retarding control vale 34. The check valve 76 permits the unidirectional flow of fluid, and thereby prevents entry of fluid into the retarding control valve 34 from the load sense line 52.

During a second mode of operation, when the retarding valve 50 is operatively positioned into a bi-directional flow-permitting position (shown in FIG. 3), fluid from the pump 36 is pumped into the supply line 44, and flows through the retarding valve 50 toward the orifice 74. The orifice 74 restricts the flow of fluid, thereby building pressure upstream. The diameter of the orifice 74 determines how much and how quickly pressure is built up across the hydraulic control system 30. In the embodiment described herein, the diameter of the orifice 74 is sized to create a pressure drop equal, or substantially equal to, the capability of the pump 36. Fluid that flows through the orifice 74, may be routed into a tank 80. Fluid may also flow through the discharge line 78 and check valve 76, thereby entering the load sense line 52. The restriction in fluid flow caused by the orifice 74, results in a buildup of pressure $P_2$. This elevated pressure $P_2$ is sensed by the pump controller (not shown), which adjusts the pump 36 displacement to generate enough fluid flow to build the pressure $P_1$ at the margin ($P_{margin}$) above pressure $P_2$. As pressure rises in the supply line 44 and in the load sense line 52, so does the discharge pressure of the pump 36. As the discharge pressure and pump 36 up to the point that the load sense relief valve 64 (FIG. 2) limits the pressure in the load sense line 52. This subsequently retards the torque output of the torque converter 38, which slows rotation of axles (not shown) of the work machine 10, thereby slowing its speed.

In the alternate embodiment illustrated in FIG. 3, a check valve 82 may be included along the load sense line 52 and positioned between the pump 36 and the implement control valve 32. The check valve 82 may be oriented so as to permit fluid to flow along the load sense line 52 from the implement control valve 32 toward the retarding control valve 34, but would prevent flow in the opposite direction. During the second mode of operation, for example, this configuration may cause pressure levels at the pump 36 to reach a high pressure cut-off value. The high pressure cut-off valve may be a higher setting than allowed by the load sense relief valve 64 shown in the embodiment illustrated in FIG. 2, thereby allowing a greater level of retarding to be obtained.

INDUSTRIAL APPLICABILITY

In operation, the present disclosure finds utility in various industrial applications, including, but not limited to, mining, construction, paving, transportation, industrial, earthmoving, agricultural, and forestry machines and equipment. For example, the present disclosure may be applied to mining machines, paving machines, dump trucks, mining vehicles, on-highway vehicles, off-highway vehicles, earth-moving vehicles, agricultural equipment, material handling equipment, and/or any machine including a non-combustion source of power.

The present disclosure includes a control strategy for braking, when a machine includes an electric motor and/or generator that is powered by a non-combustion source of power like batteries. More specifically, when a machine operator applies typical braking techniques while traveling downhill, the motor and/or generator may send a certain amount of energy to the batteries for recharge. As such, if the machine requires more stopping power, the retarding control system of the present disclosure may cause to open a hydraulic circuit that includes a restriction and may stroke up a variable displacement implement pump, thereby building pressure and providing the retarding capability.

Referring to FIGS. 1-3, the operation of the hydraulic retarding control system will be described. During operation of the work machine 10, the machine operator may have cause to travel along a ground surface 16 that is sloped downward. In this instance, the machine operator may engage a friction-based braking system to slow the speed of the work machine 10, or they may simply stop actuation of an accelerator, for example, by removing pressure from an accelerator pedal or lever. Regardless, while traveling downhill, the prime mover 26 (e.g. an electric motor and/or generator) may transfer energy to batteries or other rechargeable power source, for recharging purposes. As such, less energy may be available to generate electric retarding in the event friction-based braking is not enough to slow the work machine 10. In this case, the machine ECM 54 may determine additional hydraulic retarding is necessary.

Upon determining additional hydraulic retarding is necessary, the machine ECM 54 may activate the retarding valve 50, such that the retarding valve moves into a bi-directional flow-permitting position, allowing flow of fluid from the hydraulic pump 36 through the retarding valve and toward the orifice 74 via the supply line 44. The orifice 74 restricts fluid flow, causing pressure to increase at the site of the orifice. This pressure increase is sensed at the pump 36, which may stroke up, to equalize the pressure in the retarding control valve 34, and to maintain margin pressure in the hydraulic control system 30. As the pump 36 upstrokes, pressure builds upstream from the retarding valve 50, along the supply line 44 and into the pump 36. Fluid pressure may also increase along the load sense line 52.

As the pressure in the supply line 44 and load sense line 52 increase, the power required to operate the pump 36 may increase as well. This power is supplied by the prime mover 26 (e.g. an electric motor and/or generator) through the torque converter 38 to the pump 36. Furthermore, the torque converter 38 may be mechanically coupled to at least one axle (not shown) associated with two or more of the ground engaging mechanisms 14. Therefore, as the power required to operate the pump 36 increases, this adds resistance to the torque converter 38, which consequently slows or retards rotation of the at least one axle (not shown), thereby slowing the speed of the work machine 10.

While aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A work machine having an electric drive system, the work machine comprising:
   a prime mover;
   a machine controller; and
   a hydraulic control system, the hydraulic control system including:
      a pump, the pump configured to supply pressurized fluid to the hydraulic control system via a supply line,
      a control valve fluidly coupled to the pump via the supply line, the control valve including a pressure relief valve, and
      a retarding control valve fluidly connected to the pump and the control valve via the supply line, the retarding control valve including a solenoid valve coupled to the machine controller, an orifice restricting a flow of the pressurized fluid through the supply line, and a check valve coupled to a discharge line, the discharge line configured to branch from a point along the supply line between the solenoid valve and the orifice.

2. The work machine of claim 1, wherein the machine controller is configured to determine a retarding requirement and to supply an electrical current to the solenoid valve based on the retarding requirement.

3. The work machine of claim 1, wherein the pump is a variable displacement load-sense pump including a stroke-adjusting mechanism and a hydro-mechanical pump controller, the pump controller configured to adjust a position of the stroke-adjusting mechanism based on a predetermined margin pressure.

4. The work machine of claim 1, wherein the pump, the solenoid valve, the orifice and the pressure relief valve are fluidly connected via the supply line.

5. The work machine of claim 1, where the control valve includes a load sense relief valve and a margin pressure relief valve.

6. The work machine of claim 5, further including a load sense line fluidly connecting to the pump, the orifice, the load sense relief valve, the margin pressure relief valve, and at least one implement valve.

7. A hydraulic control system of a work machine, the hydraulic control system comprising:
   a pump, the pump configured to supply pressurized fluid to the hydraulic control system via a supply line;
   a control valve fluidly coupled to the pump via the supply line, the control valve including a pressure relief valve; and
   a retarding control valve fluidly connected to the pump and the control valve via the supply line, the retarding control valve including a solenoid valve coupled to a machine controller, an orifice restricting a flow of the pressurized fluid through the supply line, and a check valve coupled to a discharge line, the discharge line configured to branch from a point along the supply line between the solenoid valve and the orifice.

8. The hydraulic control system of claim 7, wherein the pump is a variable displacement load-sense pump including a stroke-adjusting mechanism and a hydro-mechanical pump controller, the pump controller configured to adjust a position of the stroke-adjusting mechanism to maintain a predetermined margin pressure.

9. The hydraulic control system of claim 7, further including a load sense line fluidly connecting to the pump, the orifice, the pressure relief valve, and an implement valve.

10. The hydraulic control system of claim 9, further including a load sense check valve positioned on the load sense line between the control valve and the pump, the load sense check valve configured to selectively allow a unidirectional flow of fluid from the control valve to the retarding control valve.

11. The hydraulic control system of claim 9, wherein the supply line fluidly connects the pump, the solenoid valve, the orifice, and the implement valve.

12. The hydraulic control system of claim 11, further including a first pressure of the pressurized fluid in the supply line downstream from the solenoid valve, and a second pressure of the pressurized fluid in the supply line upstream from the solenoid valve.

13. The hydraulic control system of claim 12, wherein the first pressure and the second pressure are sensed by the pump controller, the pump controller upstroking or downstroking the pump to maintain an equilibrium between the first pressure and the second pressure.

14. The hydraulic control system of claim 13, wherein the machine controller is configured to determine a retarding requirement and to supply an electrical current to the solenoid valve based on the retarding requirement, the electrical current actuating the solenoid valve between a bi-directional flow-permitting position and a unidirectional flow-permitting position.

15. The hydraulic control system of claim 14, wherein when the solenoid valve is in a bi-directional flow-permitting position, the pressurized fluid in the supply line flows through the solenoid valve and encounters the orifice, thereby elevating the second pressure.

16. The hydraulic control system of claim 15, wherein when the pump controller senses the elevated second pressure, the pump controller upstrokes the pump to elevate the first pressure.

17. The hydraulic control system of claim 16, wherein a torque resistance is increased at the pump when the first pressure and second pressure are elevated.

18. A retarding control valve of a work machine, the retarding control valve comprising:
   a proportional solenoid valve coupled to a machine controller, the machine controller configured to determine a retarding requirement and to actuate the solenoid valve based on the determined retarding requirement, the solenoid valve being fluidly coupled to a hydraulic pump via a supply line;

an orifice positioned downstream from the proportional solenoid valve and fluidly connected to the solenoid valve, the orifice restricting a flow of a pressurized fluid through the supply line when the solenoid valve is actuated; and a spring-loaded check valve coupled to a discharge line, the discharge line configured to branch from a point along the supply line between the solenoid valve and the orifice, the check valve configured to selectively allow a unidirectional flow of the pressurized fluid from the branch point along the supply line to a load sense line.

19. The retarding control valve of claim 18, wherein the load sense line fluidly connects the pump, the check valve, a pressure relief valve, and an implement valve.

20. The retarding control valve of claim 18, wherein the pump is mechanically coupled to a prime mover of the work machine via a torque converter.

* * * * *